United States Patent [19]

Aoki

[11] Patent Number: 4,943,012
[45] Date of Patent: Jul. 24, 1990

[54] DOUBLE BEARING FISHING REEL

[75] Inventor: Atsuhito Aoki, Hiroshima, Japan

[73] Assignee: Ryobi Ltd., Hiroshima, Japan

[21] Appl. No.: 153,927

[22] Filed: Feb. 9, 1988

[30] Foreign Application Priority Data

Feb. 9, 1987 [JP] Japan .................. 62-18155[U]
Feb. 9, 1987 [JP] Japan .................. 62-18156[U]

[51] Int. Cl.⁵ .......................................... A01K 89/033
[52] U.S. Cl. ................................. 242/290; 242/307; 242/310; 242/321
[58] Field of Search ............... 242/84.5 R, 84.5 A, 242/84.5 P, 84.51 R, 84.51 A, 84.53, 84.1 R, 84.1 A, 84.1 F, 84.1 J, 84.1 K, 84.1 L, 84.1 M, 84.1 N, 211, 212, 213, 214, 215, 216, 217, 218, 219, 220, 221, 290, 307, 310, 321

[56] References Cited

U.S. PATENT DOCUMENTS

| | | | |
|---|---|---|---|
| 437,627 | 9/1890 | Slote | 242/84.1 R |
| 847,350 | 3/1907 | Marhoff | 242/84.1 R |
| 1,914,470 | 6/1933 | White | 242/84.5 R X |
| 1,977,142 | 10/1934 | Pflueger | 242/84.1 K |
| 2,080,900 | 5/1937 | Shakespeare | 242/84.5 R |
| 2,098,404 | 11/1937 | Shakespeare | 242/84.5 R |
| 2,142,967 | 1/1939 | Russell | 242/84.1 R |
| 3,532,296 | 10/1970 | Murvall | 242/84.5 R |
| 3,549,103 | 12/1970 | Sarah | 242/84.5 R |
| 4,513,925 | 4/1985 | Yamaguchi | 242/84.5 A |
| 4,738,410 | 4/1988 | Yamaguchi | 242/84.5 A |

FOREIGN PATENT DOCUMENTS

| | | | |
|---|---|---|---|
| 160155 | 10/1985 | Japan | 242/84.51 A |
| 617770 | 2/1949 | United Kingdom | 242/84.5 A |
| 2158331 | 11/1958 | United Kingdom | 242/84.1 R |

OTHER PUBLICATIONS

*Daiwa Procaster Tournament PT33P* on p. 18 of the 1987 Product Catalog.

Primary Examiner—Joseph J. Hail, III
Attorney, Agent, or Firm—Finnegan, Henderson, Farabow, Garrett, and Dunner

[57] ABSTRACT

In a double bearing fishing reel, one end portion of the spool shaft rotatably supported between the right and left side frames of the reel body in such a manner as to be rotated with the handle is extended through a bearing hole formed in a male-threaded protrusion which is provided on one of the side frames, and a protrusion is formed on the cylindrical wall of a brake adjusting screw member which is threadably engaged with the male-threaded protrusion to abut against the spool shaft in the axial direction, while a retaining member is provided on the one side frame in such a manner that the protrusion and the retaining member are engageable with each other in the axial direction, whereby the brake adjusting screw member is restrained form loosening or coming off. Further, the reel has a plurality of supporting bars extending between the side frames, with one of the supporting bars at the upper portion of the reel body having a soft pad member on its upper surface to permit a thumb to be placed on the pad member when the reel is held by hand on the side opposite from the reel handle.

1 Claim, 4 Drawing Sheets

DOUBLE BEARING FISHING REEL

BACKGROUND OF THE INVENTION

This invention relates to double bearing fishing reels in which a spool shaft is rotatably supported between the two side frames of a reel body in such a manner that it is rotated in association with the rotation of a handle, and more particularly to a double bearing fishing reel having a brake mechanism.

In a conventional double bearing fishing reel brake system, as disclosed by Japanese Utility Patent Publication No. 17172/1984, a brake adjusting screw member is simply threadably engaged with a male-threaded protrusion extending from one side wall of the reel body. Therefore, even if the male thread of the male-threaded protrusion and the female thread of the brake adjusting screw member are so made that the latter is difficult to loosen, frequent adjustment of the braking force will wear the threaded parts, as a result of which the brake adjusting screw member becomes liable to loosen. Furthermore, the torque of the spool shaft is applied to the brake adjusting screw member in the thread direction. This will make the brake adjusting screw member more susceptible to loosening. As a result, the braking force applied to the spool shaft is frequently changed, or no braking force may be applied to the spool shaft. Sometimes, the brake adjusting screw member comes off, and is lost.

Further, when a reel of the above type is mounted on a fishing rod and the fishing line is let out or is wound on the reel, the reel is liable to swing right and left about the fishing rod, because the shaft of the reel is held horizontally. Therefore, the operation of letting the fishing line in and out is, in general, carried out by holding one side of the reel body with the hand which is opposite to the side of the reel body where the reel handle is positioned.

A double bearing reel has been known in the art which is so designed that a plate for placing a finger thereon is provided in the upper portion of the reel body above the spool to allow a person to hold the reel body with ease.

However, such a double bearing reel suffers from the following difficulties. The finger placing plate has a flat upper surface or it is made of hard material such as metal. Therefore, when a force is applied to the finger placing plate with the fisherman's thumb on it, the thumb may slip off or feel pain, or it will soon get fatigued.

For the purpose of eliminating the latter difficulties, a double bearing reel has been proposed in which a recess for receiving the thumb is formed in the upper surface of a finger placing plate (cf. Japanese Patent Application (OPI) No. 55368/1985 (the term "OPI" as used herein means an "unexamined published application")).

The above double bearing reel is advantageous in that, when the reel is held by hand, the end portion of the thumb is fitted in the recess, and therefore slipping of the thumb from the plate is prevented, and the reel can be securely held by hand. However, it is still disadvantageous for the following reasons. As described above, the end of the thumb is fitted in the recess when the reel is held by hand. Therefore, a reel holding force is applied to the end of the thumb fitted on the finger placing plate which is made of a hard material. Therefore, when the reel is held by hand for a long period of time, the thumb feels a pain or it is liable to get fatigued.

SUMMARY OF THE INVENTION

Accordingly, an object of this invention is to eliminate the above-described difficulties accompanying a conventional fishing double bearing reel.

Another object of this invention is to eliminate the above-described difficulties accompanying a conventional double bearing reel's brake mechanism.

More specifically, an object of the invention is to provide a double bearing reel brake mechansim which is free from the difficulties that the brake adjusting screw member becomes loose, and it comes off the reel body, and perhaps is lost.

A further object of this invention is to provide a fishing double bearing reel which is so designed that it can be securely held by hand, and even when it is held by hand for a long period of time, the fingers will not feel pain or get fatigued as a result of holding the reel.

The foregoing objects and other objects of the invention have been achieved by the provision of a double bearing fishing reel having a brake mechanism in which a spool shaft is rotatably supported between the two spaced-apart side frames of a reel body in such a manner as to be rotated in association with the rotation of a handle, one end portion of the spool shaft is extended through a bearing hole formed in a lateral male-threaded protrusion which is provided on one of the side frames, and a brake adjusting screw member is threadably engaged with the male-threaded protrusion to abut against the spool shaft in the axial direction, wherein a protrusion is formed on the cylindrical wall of the brake adjusting screw member and a retaining member is provided on one side of the frame, and the protrusion and the retaining member are engageable with each other in the axial direction to prevent the adjusting screw member from inadvertently coming off. A plurality of supporting bars support the two side frames so that the side frames are substantially parallel to each other, and, according to the invention, one of the supporting bars located at the upper portion of the reel body has a soft pad member positioned on the upper surface of the supporting bar so that, when the reel body is held by the hand of a person, the thumb can be placed on the soft member to permit the reel to be securely held.

The nature, principle and utility of the invention will become more apparent from the following detailed description when read in conjunction with the accompanying drawings.

DETAILED DESCRIPTION OF THE INVENTION

Preferred embodiments of this invention will be described with reference to the accompanying drawings.

Figure 1:
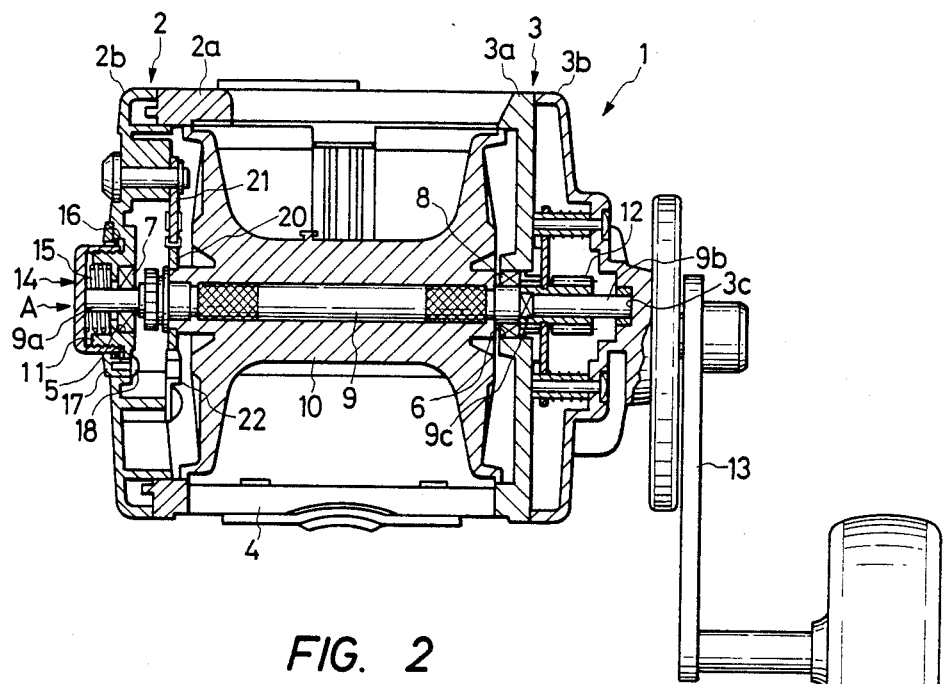
FIG. 1 is a vertical sectional view showing a first example of a double bearing reel having a brake mechanism and a soft pad member according to this invention.

In one embodiment of the invention, a reel body 1 as shown in FIG. 1, comprises: right and left side frames 3 and 2; and main support bars 4 are connected between the spaced-apart side frames 2 and 3 with screws in such a manner that the side frames 2 and 3 are supported substantially parallel to each other. The side frame 2 is made up of a side plate 2a and a cover plate 2b secured to the outside of the side plate 2a with screws to form a space therebetween. Similarly, the side frame 3 is made up of a side plate 3a and a cover plate 3b secured to the outside of the side plate 3a with screws to form a space therebetween.

Cover plates 2b and 3b are secured to the side frames 2 and 3 respectively, with screws 26. A clutch mechanism (not shown) and a gear transmission mechanism (not shown) are built in the space between the side frame 3 and the cover plate 3b.

Figure 7:
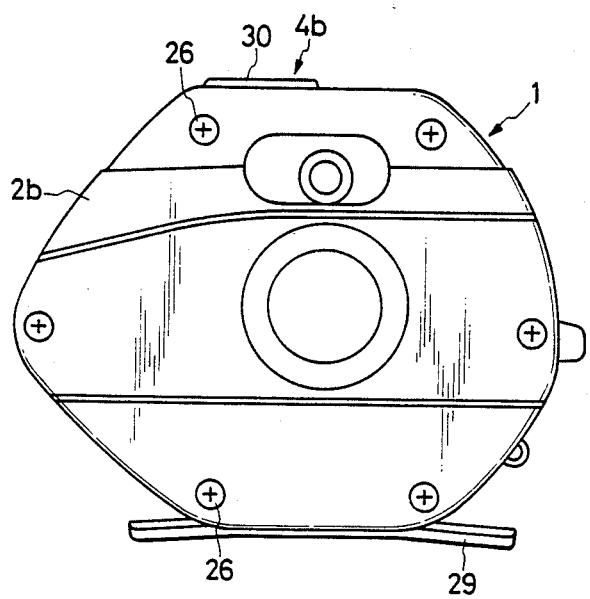
FIG. 7 is a left side view of the double bearing fishing reel of FIG. 6.

As shown in FIG. 7, a leg 29 is secured to the side frames 2 and 2' in such a manner as to bridge the lower ends of the side frames 2 and 3. The leg 29 is detachably mountable on the reel seat (not shown) of a fishing rod.

Bearing holes 5 and 6 are formed in the cover plate 2b of the side frame 2 and in the side plate 3a of the side frame 3, respectively. A spool shaft 9, on which a spool 10 is fixedly mounted to rotate therewith, is rotatably supported by the side frames 2 and 3 through bearings 7 and 8 fitted in the bearing holes 5 and 6, respectively. One end portion (left end portion) of the spool shaft 9 protrudes into a cylindrical male-threaded protrusion 11 which extends laterally to the left (outwardly) from the periphery of the bearing hole 5 of the cover plate 2b in such a manner that it is coaxial with the bearing hole 5.

The other end portion (right end portion) 9b of the spool shaft 9 includes a segmental portion 9c, and a pinion 12 is mounted on the end portion 9b in such a manner that it is slidable in the axial direction and engageable with a segmental portion 9c. That is, when the pinion 12 is engaged with the segmental portion 9c, it is turned together with the spool shaft 9, and when the pinion 12 is disengaged from the segmental portion 9c, the spool shaft 9 is allowed to freely turn. When a handle 13 is turned, the torque is transmitted through the pinion 12 and a clutch mechanism (not shown) to the spool shaft 9 to rotate the shaft 9.

The right end portion 9b of the spool shaft 9 is fitted in a bearing hole 3c formed in the cover plate 3b so that the movement of the spool shaft 9 to the right is prevented.

Figure 2:
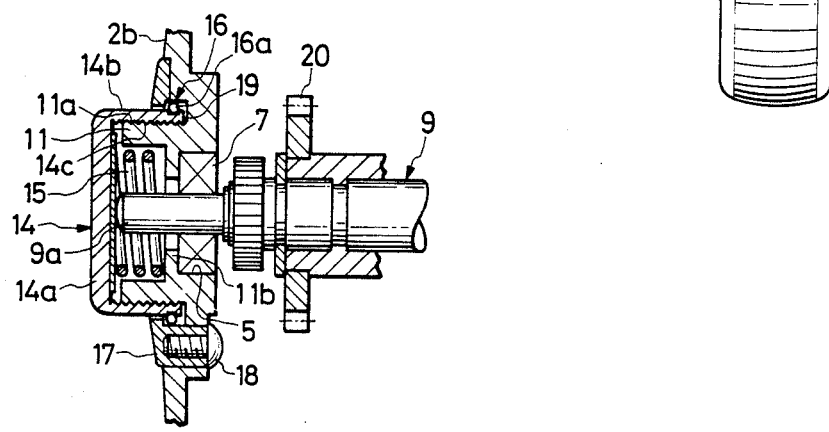
FIG. 2 is an enlarged vertical sectional view showing the part A in FIG. 1.

As shown in FIG. 2, the male-threaded protrusion 11 has a male-thread 11a on the outer wall. A brake adjusting screw member 14 is threadably engaged with the male-threaded protrusion 11. The brake adjusting screw member 14 is substantially in the form of a cup made up of a substantially flat end wall 14a and a cylindrical wall 14b the inner surface of which is female-threaded as indicated at 14c. The inner surface of the end wall 14a abuts against the end face of the left end portion 9a of the spool shaft in the axial direction to brake the spool shaft 9 and, accordingly, the spool 10 when screwed onto the protrusion 11.

A brake adjusting spring is interposed between the end wall 14a of the adjusting screw member 14 and a flange 11b extending radially inwardly from the cylindrical wall male-threaded protrusion 11, to prevent the brake adjusting screw member 14 from being loosened.

A protrusion 16 extends radially from the periphery of the end portion of the cylindrical wall 14b of the brake adjusting screw member 14, and a retaining member 17 is fixedly secured to the outside of the cover plate 2b, in such a manner that the inner surface of the retaining member 17 is engaged with the outer surface of the protrusion 16, so that the brake adjusting screw member 14 is prevented from inadvertently coming off the male-threaded protrusion 11.

The protrusion 16 is formed as follows: As shown in FIGS. 1 and 2, a groove 19 is cut in the outer surface of the cylindrical wall 14b of the brake adjusting screw member 14, and a retaining ring 16a is fitted in the groove 19 thus formed. Alternatively, as shown in FIGS. 3 through 5, a flange 16b extends radially outwardly from the cylindrical wall 14b of the brake adjusting screw member 14.

The double bearing reel shown in FIGS. 1 and 2 is so designed that a gear 20 secured to the spool 10, a click pawl 21 pivotally mounted on the cover plate 2b, and a click spring 22 secured to the cover plate 2b cooperate to produce click sounds when the spool is turned.

Figure 3:
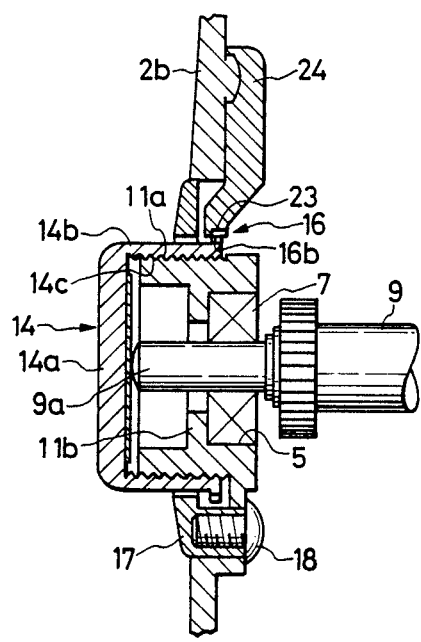
FIG. 3 and 4 are vertical sectional views showing second and third examples of the double bearing reel's brake mechanism according to the invention, respectively.

In the double bearing reel shown in FIG. 3, the outer wall of the flange 16b is cut to form a wavy, or irregular, surface 23 having ridges set at predetermined pitch, and the wavy surface 23 is engaged with a clapper 24 secured to the cover plate 2b so that not only the brake adjusting screw member 14 is restrained from being loosened, but also click sounds are produced when the brake adjusting screw member 14 is turned.

Figure 4:
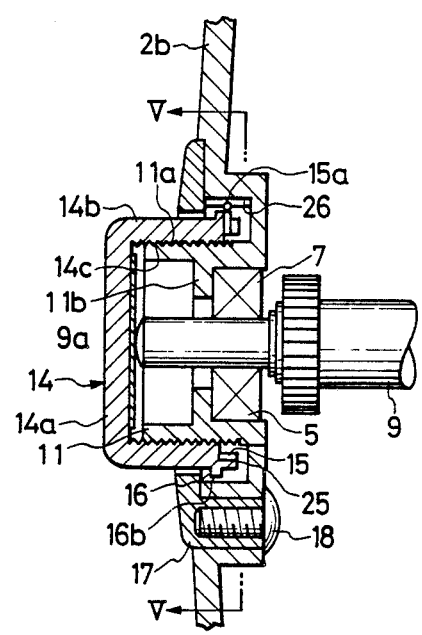
Figure 5:
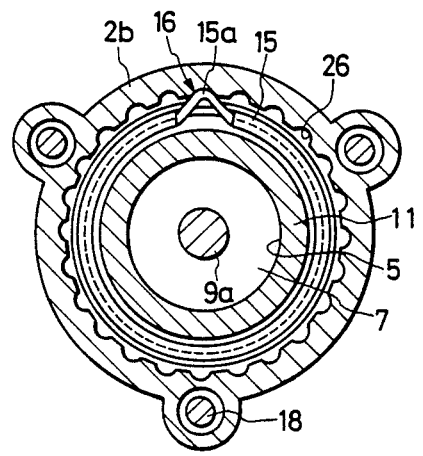
FIG. 5 is a sectional view taken along line V—V in FIG. 4.

In the double bearing reel shown in FIGS. 4 and 5, an annular brake adjusting spring 15 is fitted in an annular groove 25 formed in the cylindrical wall 14b of the brake adjusting screw member 14, and a protrusion 15a extended radially outwardly from the brake adjusting spring 15 is engaged with a wavy surface 26 which is formed in the cylindrical wall of the recess of the cover plate 2b, to restrain the brake adjusting screw member 14 from being loosened and to produce click sounds when the brake adjusting screw member 14 is turned.

As was described above, in the double bearing reel's brake mechanism according to the invention, the brake adjusting screw member 14 is threadably engaged with the male threaded protrusion 11 of the side frame 2 to abut against the end face of the one end portion 9a of the spool shaft 9 which protrudes through the bearing hole 5 of the side frame 2, thereby to brake the rotation of the spool. In the brake system, the protrusion 16 formed on the cylindrical wall 14b of the brake adjusting screw member 14 is made engageable with the retaining member 17 of the side frame 2 in the axial direction. Therefore, if the brake adjusting screw member 14 is loosened for instance because of the torque of the spool shaft 9, then the protrusion 16 is engaged with the retaining member 17 to prevent the brake adjusting screw member 14 from coming off; i.e., the loss of the member 14.

Furthermore, the double bearing reel's brake mechanism can be manufactured at low cost because it can be formed merely by providing the protrusion 16 and the retaining member 17 respectively on the brake adjusting screw member 14 and the side frame 2 in such a manner that the protrusion 16 and the retaining member 17 is engageable with each other.

Figure 6:
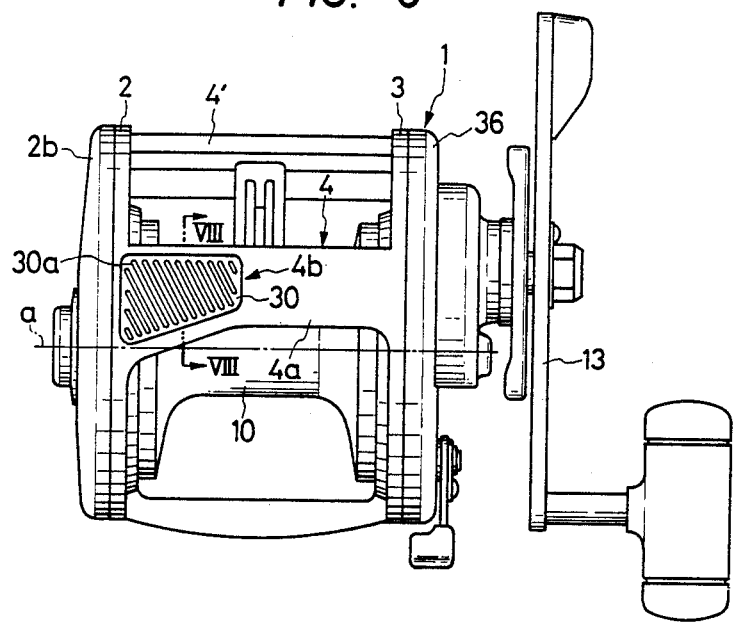
FIG. 6 is a plan view showing one example of a double bearing fishing reel according to this invention and illustrating the soft pad member.

Of the above-described supporting bars 4 and 4', the supporting bar 4, as shown in FIG. 6 preferably has a flattened upper surface, is located above the spool 10 and ahead of the central axis a of the spool. The supporting bar 4 has a soft pad member 30, for example, of soft rubber or soft synthetic resin positioned on its upper surface 4b upon which, the thumb of the person holding the fishing rod can be placed. When the reel is held by hand on the side opposite the side on which the reel handle 13 is positioned.

Figure 9:
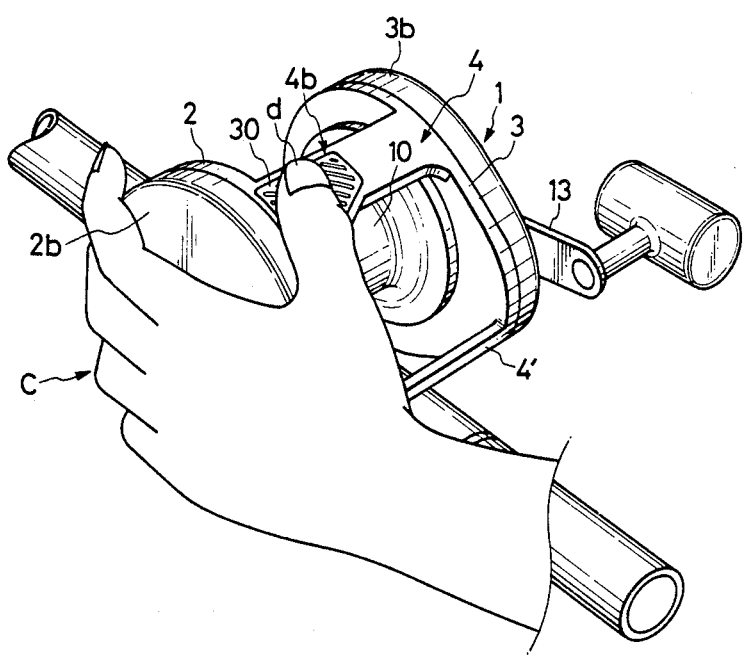
FIG. 9 is a perspective view showing the reel of FIG. 6 held by hand.

In other words, the soft member 30 is provided on the supporting bar 4 at the part 4b which, when the person's hand c holds the reel body 1 as shown in FIG. 9, his thumb d touches. The provision of the soft member 30 prevents the thumb from slipping, thus allowing the person to securely hold the reel. In addition, the feeling of contact and the feeling of having a good hold with the thumb is improved. Accordingly, even when the reel is held with the hand for a long period of time, the thumb will not feel a pain or get fatigued as readily.

Figure 8:
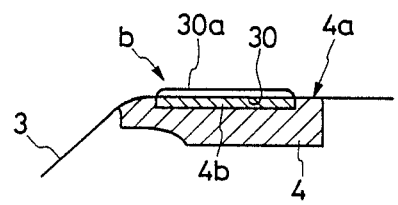
FIG. 8 is a sectional view taken along line III—III in FIG. 6.

The soft pad member 30 is in the form of a plate wide enough to be touched by the thumb from flat to tip. It is bonded to the upper surface 4a of the supporting bar 4. Alternatively, it may be fitted into the recess 4b which is formed in the upper surface 3a of the supporting bar 3 as shown in FIG. 8.

The upper surface of the soft member 10 is formed so as to permit good contact with the thumb. For example, it may be an irregular surface such as a matte-finish, or it may be made uneven by formation of grooves or ridges 10a as shown in FIG. 6 so that the thumb readily fits the soft member. In the latter case, it is preferable that the grooves or ridges 10a extend in a direction approximately perpendicular to the length of the thumb d when the hand c holds the reel body 1 on the side opposite the side of the reel handle 13.

As was described above, in the double bearing fishing reel of the invention, the reel body 1 has a soft member 30 on the part 4b of the upper surface 4a of the upper supporting bar 4 which, when a person holds the reel, permits the thumb to be placed on the soft member. Therefore, a person can hold the reel body 1 with his thumb on the soft member 30. In this case, the thumb will fit and not slip off the soft member 30, which will allow the person to securely hold the reel. Furthermore, the wide area of the thumb d, from flat to tip, can be used to apply a reel holding force to the soft member 30, and therefore even when the reel is held with the hand for a long period of time, the hand or thumb will not feel a pain nor get fatigued. In accordance with the invention, a reel with which a person can enjoy fishing comfortably for a long period of time can be manufactured readily at low cost.

Having described preferred embodiments of the present invention, it is recognized that variations and modifications thereof falling within the spirit and scope of the invention as defined by the appended claims will become apparent to those skilled in the art.

WHAT IS CLAIMED IS:

1. A double bearinng fishing reel comprising:
   (a) a reel body having two spaced-apart side frames opposite each other;
   (b) a spool shaft having two end portions rotatably supporting said shaft between said side frames and being rotatable in association with the rotation of a reel handle;
   (c) a cylindrical male-threaded protrusion extending laterally from one of said side frames and having a bearing hole therein for receiving one end portion of said spool shaft, said male-threaded protrusion having a first cylindrical wall coaxial with said bearing hole, and a first flange member extending radially inwardly from said first cylindrical wall;
   (d) a brake adjusting screw member having a second cylindrical wall and an end wall, wherein the inner wall of said second cylindrical wall is provided with an annular groove, and further including an annular brake adjusting spring fitted in said annular groove, a protrusion extending radially outwardly from said brake adjusting spring, and a wavy surface formed on the inner peripheral surface of a recess of said one side frame so that said wavy portion is engaged with said protrusion from said annular brake adjusting spring to restrain said brake adjusting screw from being loosened and to produce click sounds when said brake adjusting screw member is turned, said second cylindrical wall being threadably engaged with said male-threaded protrusion and said end wall abutting against one end portion of said spool shaft in the axial direction when screwed onto said male-threaded protrusion;
   (e) a radial protrusion extending radially outwardly from said second cylindrical wall and having an outer end surface;
   (f) a retaining member affixed by fasteners to the outside of said one side frame and having a central bore with a second flange member extending radially inwardly, said second flange member having an inner surface adapted to engage with said outer end surface of said protrusion on said second cylindrical wall so as to restrain said brake adjusting screw member from inadvertently coming off said protrusion of said side frame.

* * * * *